Patented July 25, 1939

2,167,351

UNITED STATES PATENT OFFICE 2,167,351

PIPERIDINE COMPOUNDS AND A PROCESS OF PREPARING THEM

Otto Eisleb, Hofheim-in-Taunus, Germany, assignor to Winthrop Chemical Company, Inc., New York, N. Y., a corporation of New York No Drawing. Application August 4, 1938, Serial No. 223,014. In Germany August 7, 1937

8 Claims. (Cl. 260—294)

The present invention relates to piperidine compounds and a process of preparing them.

I have found that piperidine compounds may be prepared in a simple manner by causing di-(beta-halogenalkyl)-amine of the formula:

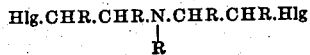

wherein R stands for hydrogen or a monovalent hydrocarbon radical, to react with an arylacetonitrile in the presence of an agent capable of splitting off hydrogen halide. The nitriles thus obtained can after known methods be transformed into the corresponding amides, acids and esters. As an agent capable of splitting off hydrogen halide there may be used for instance sodium or any active sodium compounds such as sodium amides or sodium phenylate.

The compounds thus obtainable have the following general formula:

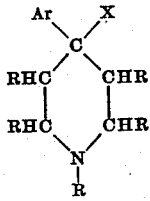

wherein Ar stands for aryl, R stands for hydrogen or a monovalent hydrocarbon radical, and X stands for carboxyl or the functional derivatives of the carboxyl group.

The compounds of the following general formula are of special significance:

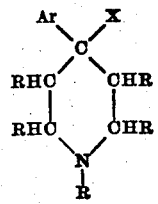

wherein Ar stands for aryl, X stands for a member of the group consisting of —CN, —CO.NH₂ or COOY, Y standing for alkyl, aryl or aralkyl, R stands for hydrogen or a monovalent hydrocarbon radical.

The new compounds are in part themselves of medical value and in part useful for the preparation of new medicaments.

The following examples serve to illustrate the invention but they are not intended to limit it thereto; the parts are by weight:

(1) *1 - methyl-4-phenyl - piperidine-4-carboxylic acid and the derivatives thereof*

80 parts of finely pulverised sodium amide are added in portions each of about ⅕ of the entire quantity, while stirring and cooling in a suitable manner, to a mixture of 156 parts of methyl-di(beta-chloroethyl)-amine (prepared from diethanol-methylamine by means of thionyl chloride), 117 parts of benzyl cyanide and 600 parts of toluene. The reaction sets in at once at room temperature. The temperature of the mixture is maintained between 30° C. and 40° C.; when self-heating of the mixture no longer occurs a further portion of the sodium amide is introduced during the reaction of which always a large quantity of heat is liberated and gaseous ammonia escapes. The mixture is then slowly heated to the boiling of the toluene and kept boiling for one hour under reflux. After the mixture has been allowed to cool the sodium chloride which precipitates is separated by extraction with water. The solution of toluene is then extracted with dilute hydrochloric acid. From the hydrochloric acid extract the basic substance is separated in the form of an oil by means of caustic soda solution and is introduced into ether. The ethereal solution is dried with the aid of potassium carbonate and then distilled. Under a pressure of 4.5 millimetres the 1-methyl-4-phenyl-piperidine-4-carboxylic acid nitrile passes over at a temperature of about 148° C. in the form of a colorless oil, under a pressure of 6 millimetres it passes over at about 158° C. After having been allowed to cool the distillate solidifies completely to form a crystalline mass. Its solidification point is at 53° C.; the yield amounts to about 135 parts, that is about ⅔ of the theoretical yield. When recrystallized from isopropyl alcohol the hydrochloride of the nitrile forms colorless crystals, readily soluble in water and melting at 221° C. to 222° C.

The nitrile may best be saponified with methyl alcoholic potash while heating to 190° C.–200° C. with application of pressure. After the methyl alcohol has evaporated the salt is introduced into water and, by the addition of dilute mineral acid until the alkaline reaction to phenolphthalein has just disappeared, the amphoteric 1-methyl-4-phenyl-piperidine-4-carboxylic acid is precipitated while hot in the form of a colorless, coarsely crystalline powder. When dried on the water bath the acid still contains 1 mol of crystal water which is lost only at a raised temperature. The acid melts at 299° C.; it may well be recrystallized from water; the solution has a neutral reaction to litmus. The acid is readily soluble in caustic soda solution and in dilute hydrochloric acid and to a somewhat smaller extent in sodium carbonate solution. It may be precipitated from an alkaline solution by means of carbon dioxide. When heated to above its melting point the acid gradually gives off carbon dioxide and is transformed into 1-methyl-4-phenyl-piperidine, boiling at 130° C. under a pressure of 15 mm. and at 255° C.–260° C. under normal pressure. It is a thinly liquid colorless oil, the hydrochloride of which, recrystallized from acetone, forms colorless crystals melting at 196° C.–197° C. which are readily soluble in water.

The hydrochloride of 1-methyl-4-phenyl-piperidine-4-carboxylic acid chloride, in the form of a colorless crystalline powder which slowly decomposes when heated over 130° C., may readily be obtained from the acid by dissolving the latter in thionyl chloride and distilling the excess.

By dissolving the hydrochloride of the acid chloride in alcohols and amines for instance the following derivatives are obtained in a good yield:

*Methyl ester:* hydrochloride, crystallized from acetone, colorless crystals, melting at 202° C. with decomposition.

*Ethyl ester:* base, a radiated crystalline mass, melting at 30° C., boiling at 147° C. under a pressure of 3 mm.; hydrochloride, colorless crystalline powder, melting at 187° C.–188° C.

*Butyl ester:* hydrochloride, crystallized from ethyl acetate in colorless crystals melting at 161° C.–162° C.

*Benzyl-ester:* hydrochloride, from water colorless crystals containing crystal water, melting at 172° C.–173° C.

*Phenyl ester:* hydrochloride from isopropyl alcohol, thin colorless needles, melting at 208° C.–209° C.

*Beta-diethylaminoethylester:* base, colorless oil boiling at about 163° C. under a pressure of 1 mm.; dihydrochloride, colorless crystalline powder, melting at 181° C.–182° C.

*Amide:* base, colorless crystals; hydrochloride from alcohol, colorless crystals, melting at 235° C.

*Diethylamide:* base, oil, boiling at 180° C.–183° C. under a pressure of 4 mm.; hydrochloride, crystallized from ethyl acetate, melts at 180° C.–182° C.

*Beta-diethylaminoethylamide:* base, boiling at about 193° C. under a pressure of 1 mm. Melting point about 57° C.

*Urea:* base, colorless crystalline powder, melting at 225° C.–227° C. with decomposition.

(2) *1-benzyl-4-phenyl-piperidine- 4 - carboxylic-acid and the derivatives thereof*

For the manufacture of the required benzyl-di(betachlorethyl)-amine diethanolamine is caused to react with benzyl chloride so as to form diethanolbenzylamine, a viscous liquid boiling between 180° C. and 190° C. under a pressure of between 4 and 5 mm. By the reaction of the diehtanolbenzylamine with an excess of thionyl chloride the two hydroxyl groups are substituted by chlorine. The base is set free, while cooling, with the aid of caustic soda solution, introduced into ether and dried with the aid of potassium carbonate. The ether is distilled finally under reduced pressure. The base remains in the form of an oil of feebly brownish color.

80 parts of finely pulverized sodium amide are gradually added, while stirring and cooling with ice, to 117 parts of benzyl cyanide, 232 parts of benzyl-di(beta-chloroethyl)-amine and 600 parts of toluene. During the introduction of the amide the temperature is kept between 35° C. and 50° C. The mixture is then gradually heated to boiling and boiled for one hour under reflux. After the mixture has been cooled dilute hydrochloric acid is added and the whole is shaken until the acid reaction to congo remains. There is obtained a thick crystalline magma which is filtered by suction on a wide filter and pressed. The product, the 1-benzyl-4-phenyl-piperidine-4-carboxylic-acid-nitrile hydrochloride, is then recrystallized from methyl alcohol. It is obtained therefrom in the form of colorless needles in a yield of about 180 parts; it melts at 259° C.–260° C., even when further recrystallized from water. 30 parts of boiling water dissolve 1 part of the salt. The free 1-benzyl-4-phenyl-piperidine-4-carboxylic acid nitrile is precipitated from the hot aqueous solution of the hydrochloride by sodium carbonate; it melts at 75° C.–76° C. It may best be saponified to form the acid by means of a methyl alcoholic caustic soda lye with application of pressure at a temperature of between 190° C. and 200° C.

The 1-benzyl-4-phenyl-piperidine-4-carboxylic-acid is a colorless crystalline powder of melting point 285° C.–286° C. which is readily soluble in dilute hydrochloric acid and soluble to a small extent in an excess of dilute acetic acid and in ammonia. The hydrochloride of the acid chloride may readily be produced by dissolving the acid in thionyl chloride and evaporating the excess. It is a colorless crystalline powder. With ethyl alcohol it yields the ethyl ester hydrochloride; this crystallizes in the form of needles from alcohol, which crystals melt at 236° C. with decomposition. The product is soluble to a small extent in water and to a rather large extent in hot water. The base which is precipitated from the aqueous solution of the hydrochloride by sodium carbonate is a colorless crystalline powder melting at 73° C.–74° C.

By the reaction of benzylcyanide with di(beta-chloroethyl)-amine in a solution of toluene with sodium amide the 4-phenyl-piperidine-4-carboxylic acid is obtained only in a very small yield.

For the manufacture of 4-phenyl-piperidine-4-carboxylic acid and the derivatives the parent material may be the hydrochlorides of the 1-benzyl-4-phenyl-piperidine-4-carboxylic acid or the derivatives thereof. These starting materials are shaken in an alcoholic solution together with palladium and hydrogen by which operation the benzyl radical is readily eliminated while hydrogen is incorporated. Thus from the above named hydrochloride of 1-benzyl-4-phenyl-piperidine-4-carboxylic acid ethyl ester there is obtained for example the hydrochloride of 4-phenyl-piperidine-4-carboxylic acid ethyl ester in the form of a colorless crystalline powder which when recrystallized from ethyl acetate melts at 133° C.–134° C. and is very readily soluble in water.

(3) *1-methyl - 4 -(para-methoxy-phenyl) - piperidine-4-carboxylic acid nitrile*

Methyl-di(beta-bromoethyl)-amine can be produced from methyl-di(beta-oxyethyl)-amine-hydrobromide by treatment with hydrogen bromide at an elevated temperature; after the salt has been dissolved in water, the base is set free by means of caustic soda solution, while well cooling, and introduced into toluene. The toluene solution, dried over potassium carbonate and containing 123 parts of methyl-di(beta-bromoethyl)-amine in 500 parts of toluene is mixed with 73 parts of 4-methoxybenzylcyanide. 42 parts of pulverized sodium amide in portions of about 5 g. are then gradually added while stirring and cooling, the temperature thus being kept at between 40° C. and 50° C. The mixture is then slowly heated to boiling and boiled in a reflux apparatus until the separation of ammonia has ceased. It is then worked up as described in Example 1. The nitrile boils at 182° C. to 185° C. under a pressure of 5 mm., being an almost colorless oil which rapidly and completely solidifies. The yield is not quite as good as in the case of using, under the same conditions of treatment, 78 parts of methyl-di(beta-chlorethyl)-amine instead of the above named 123 parts of methyl-di(beta-bromoethyl)-amine 63 per cent. of the theoretical yield).

(4) *1,3,5-trimethyl-4-phenyl-piperidine-4-carboxylic acid nitrile*

By causing propyleneoxyde to react with an aqueous solution of methylamine there is obtained, besides a small amount of methyl-(beta-oxypropyl)-amine which boils at 149° C.-152° C. under normal pressure for the most part the methyl-di(beta-oxypropyl)-amine boiling at 102° C.-103° C. under a pressure of 7 mm.; it is a colorless liquid which, having been caused to react with thionylchloride, yields the hydrochloride of the methyl-di(beta-chloropropyl)-amine. It is dissolved in water and the base is set free by the reaction with caustic soda solution while well cooling. It is then introduced into toluene, the solution of toluene separated is dried over sodium carbonate. For the future reaction a solution containing 184 parts of methyl-di(beta-chloropropyl)-amine in 500 parts of toluene, is used. After the addition of 117 parts of benzylcyanide 84 parts of pulverized potassium amide are introduced at a temperature between 35° C. and 40° C. while stirring and suitably cooling. The mixture is then gradually heated to boiling and boiled for 2 hours in a reflux apparatus. It is worked up as described in Example 1. The 1.3.5-trimethyl-4-phenylpiperidine-4-carboxylic acid nitrile thus obtained boils at about 157° C. under a pressure of 6 mm. It is a feebly yellowish oil. The yield amounts to 90 parts. The saponification of the nitrile to form the carboxylic acid, for instance with the aid of methylalcoholic caustic potash solution by heating to 200° C. takes place not as readily and more slowly than in the case of the nitrile of Example 1. The 1.3.5-trimethyl-4-phenylpiperidine-4-carboxylic acid thus obtained crystallizes from water in the form of thin white needles which melt at 291° C. with decomposition.

(5) *1-methyl-3.5-di-methoxymethyl-4-phenyl-piperidine-4-carboxylic acid nitrile*

By causing the methyl-(beta-gamma-epoxypropyl)-ether (epimethyline) to react with an aqueous solution of methyl-amine there is obtained the methyl-di(gamma-methoxy-beta-oxypropyl)-amine, being a colorless liquid, boiling at 160° C.-163° C. under a pressure of 13 mm., the hydrochloride of which is, by the aid of thionylchloride, transformed into methyl-di(gamma-methoxy-beta-chloropropyl)-amine, which as a base constitutes a feebly brownish oil. 119 parts of methyl-di(gamma-methoxy-beta-chloropropyl)-amine, 58 parts of benzylcyanide and 300 parts of toluene are worked up together with 42 parts of sodium amide as described in Example 1. There are obtained 32 parts of nitrile boiling at 185° C.-195° C. under a pressure of 6 mm. (mainly at 190° C.), being a yellowish oil.

(6) *1-methyl-4-(naphthyl-alpha)-piperidine-4-carboxylic acid and the derivatives thereof*

By treating, under the same conditions as described in Example 1, 167 parts of alpha-menaphthylcyanide (naphthyl-alpha-acetic acid nitrile) and 156 parts of methyl-di(beta-chloroethyl)-amine in 500 parts of toluene together with 84 parts of sodium amide there are obtained 50 per cent. of the theoretical yield of 1-methyl-4-(naphthyl-alpha)-piperidine-4-carboxylic acid nitrile, boiling at about 202° C. under a pressure of 3 mm. Recrystallized from cyclohexane it forms colorless crystals, melting at 112° C.-113° C. Its hydrochloride is a colorless crystalline powder, readily soluble in water. It decomposes at 275° C.-276° C.

While heating the nitrile with addition of methyl-alcoholic potash lye for 6 hours at a temperature of 210° C.-220° C. under normal pressure, the nitrile saponifies. The free acid can not be separated by neutralization from the aqueous solution of the potassium salt obtained. The hydrochloride of the acid is a colorless crystalline powder, readily soluble in water and in alcohol. The ethyl ester obtained by boiling the hydrochloride with alcohol containing hydrochloric acid, forms a feebly yellowish syrup which distils at about 185° C. under a pressure of 1.5 mm. Its hydrochloride, recrystallized from amylacetate, melts at 185° C.-187° C. with decomposition; it forms a colorless crystalline powder, which is readily soluble in water and in alcohol.

(7) *1.4-bis-phenyl-piperidine-4-carboxylic acid and the derivatives thereof*

218 parts of di(beta-chloroethyl)-aniline and 117 parts of benzylcyanide diluted with 500 parts of toluene are caused to react with 80 parts of pulverulent sodium amide in the same way as described in Example 2. The hydrochloride of the 1.4-bis-phenyl-piperidine-4-carboxylic acid nitrile precipitated by the subsequent treatment with dilute hydrochloric acid is obtained in a pure state after filtering it with suction and washing it with methylalcohol (⅔ of the theoretical yield). It forms a colorless crystalline powder melting at 232° C.-234° C. When heated with the aid of water a hydrolitic decomposition occurs for the most part, while an insoluble base separates. The base, separated from the hot aqueous solution with the aid of ammonia, rapidly solidifies; it melts at 96° C.-97° C. even when recrystallized from methyl alcohol from which it is obtained in the form of thick, colorless needles.

The nitrile may best be saponified to the acid with the aid of sulfuric acid of 70 per cent. strength, at a temperature of 140° C.-150° C. The acid is a fine, colorless crystalline powder melting at 220° C.-221° C. and being completely insoluble in water. The hydrochloride of the acid chloride, obtained from the acid in suspension of benzene with phosphor-pentachloride, is a colorless crystalline powder; being caused to react with beta-diethylaminoethanol it yields the hydrochloride of the 1.4-bis-phenyl-piperidine-4-carboxylic acid beta-diethylaminoethylester which is a colorless crystalline powder, fairly readily soluble in water and melting at 179° C.

With the aid of 1-amino-2-diethylaminoethane there may be obtained the 1.4-bis-phenyl-piperidine-4-carboxylic acid-beta-diethylaminoethylamide. The free base is oily; with addition of water it constitutes a crystalline hydrate. The monohydrochloride is a colorless crystalline powder melting at 203° C.-204° C.

(8) *1 - cyclohexyl - 4 - phenyl - piperidine-4-carboxylic acid and the derivatives thereof*

NN - di - (beta-oxyethyl) -N-cyclohexylamine is obtained by causing cyclohexylamine to react with 2 mols of ethylene-chlorhydrine and caustic soda solution. It boils at about 150° C. under a pressure of 3 mm. and is a colorless and almost odorless oil which, with the aid of thionyl chloride, yields the hydrochloride of the NN-di-(beta-chloroethyl)-cyclohexylamine, being a colorless crystalline powder which, dissolved in water with the aid of caustic soda solution yields the free oily base which is eliminated and isolated in the usual manner.

224 parts of the NN-di(beta-chloroethyl)-cyclo-hexylamine thus obtained, 117 parts of benzylcyanide and 500 parts of toluene are caused to react with 117 parts of pulverulent sodium amide in the way as described in Example 2. After shaking the whole with dilute hydrochloric acid a crystalline magma is obtained which is filtered with suction, washed with ether, pressed out and recrystallized from methyl alcohol. The hydrochloride of the 1-cyclohexyl-4-phenyl-piperidine-4-carboxylic acid nitrile is thereby obtained in a pure form (61 per cent. of the theoretical yield). Colorless crystals, decomposition point 303° C.-304° C. It may be readily recrystallized from water. The base of the nitrile forms colorless crystals melting at 99° C.-100° C. It is readily soluble in alcohol, ether, benzine, acetone and may be recrystallized from methyl alcohol.

The free 1-cyclohexyl-4-phenyl-piperidine-4-carboxylic acid obtained by saponification of the nitrile in the usual manner is a colorless crystalline powder, melting at about 358° C. with decomposition.

The ethyl ester has a melting point of 61° C.-62° C.; its hydrochloride melts at 223° C. with decomposition.

I claim:

1. The process which comprises reacting a di-(beta-halogenalkyl)-amine of the formula:

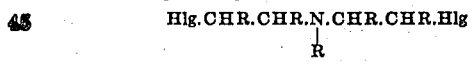

wherein R stands for a member of the group consisting of hydrogen and a monovalent hydrocarbon radical, with an arylacetonitrile in the presence of an agent capable of splitting off hydrogen halide.

2. The process which comprises reacting a di-(beta-halogenalkyl)-amine of the formula:

wherein R stands for a member of the group consisting of hydrogen and a monovalent hydrocarbon radical, with an arylacetonitrile in the presence of an agent capable of splitting off hydrogen halide, and transforming the piperidine-4-carboxylic acid nitrile thus obtained into a member of the group consisting of the corresponding amides, acids and esters.

3. The process which comprises reacting a di-(beta-halogenalkyl)-amine of the formula:

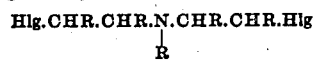

wherein R stands for a member of the group consisting of hydrogen and a monovalent hydrocarbon radical, with an arylacetonitrile in the presence of sodium amide.

4. The compounds of the following general formula:

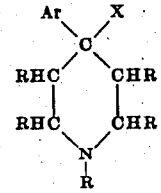

wherein Ar stands for aryl, R stands for a member of the group consisting of hydrogen and a monovalent hydrocarbon radical and X stands for a member of the group consisting of carboxyl and the functional derivatives of the carboxyl group.

5. The compounds of the following general formula:

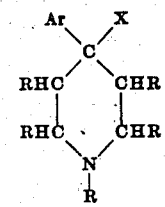

wherein Ar stands for aryl, X stands for a member of the group consisting of —CN, —CO.NH₂ and COOY, Y standing for alkyl, aryl or aralkyl, R stands for a member of the group consisting of hydrogen and a monovalent hydrocarbon radical.

6. The compounds of the general formula:

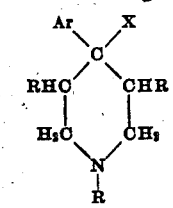

wherein Ar stands for aryl, X stands for a member of the group consisting of —CN, —CO.NH₂ and COOY, Y standing for alkyl, aryl or aralkyl, R stands for a member of the group consisting of hydrogen and a monovalent hydrocarbon radical.

7. The compound of the formula:

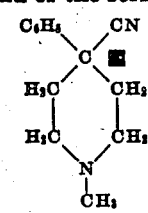

8. The compound of the formula:

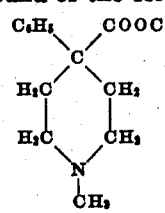

OTTO EISLEB.